United States Patent
Livingston

(10) Patent No.: US 9,042,266 B2
(45) Date of Patent: May 26, 2015

(54) METHODS AND APPARATUS FOR INITIALIZING A NETWORK CONNECTION FOR AN OUTPUT DEVICE

(75) Inventor: Edward Livingston, Toronto (CA)

(73) Assignee: KIK Interactive, Inc., Waterloo, ON (CA)

( * ) Notice: Subject to any disclaimer, the term of this patent is extended or adjusted under 35 U.S.C. 154(b) by 202 days.

(21) Appl. No.: 13/332,488

(22) Filed: Dec. 21, 2011

(65) Prior Publication Data

US 2013/0163442 A1 Jun. 27, 2013

(51) Int. Cl.
| | | |
|---|---|---|
| *H04L 12/28* | (2006.01) | |
| *H04W 4/00* | (2009.01) | |
| *H04L 12/56* | (2006.01) | |
| *H04W 48/16* | (2009.01) | |
| *H04W 68/12* | (2009.01) | |

(Continued)

(52) U.S. Cl.
CPC ............. *H04W 48/16* (2013.01); *H04W 68/12* (2013.01); *H04W 88/06* (2013.01); *H04W 84/12* (2013.01)

(58) Field of Classification Search
CPC ..... H04W 48/16; H04W 68/12; H04W 88/06; H04W 84/12
USPC ........ 725/14, 131, 37, 62; 455/552, 436, 574, 455/41.2, 426.2; 340/286; 315/20; 709/223; 726/26; 370/349, 254, 338, 401
See application file for complete search history.

(56) References Cited

U.S. PATENT DOCUMENTS

| | | | |
|---|---|---|---|
| 5,708,804 | A | 1/1998 | Goodwin et al. |
| 5,905,863 | A | 5/1999 | Knowles et al. |
| 6,018,761 | A | 1/2000 | Uomini |

(Continued)

FOREIGN PATENT DOCUMENTS

| | | |
|---|---|---|
| CA | 2 353 161 | 1/2002 |
| CA | 2 485 791 | 1/2002 |

(Continued)

OTHER PUBLICATIONS

Verizon | FiOS TV Central—Manage Your FiOS TV Online, [Online] Retrieved from the Internet <URL: https://www22.verizon.com/fiostv/web/unprotected/App_FiOSMobileRemote.aspx> Jan. 10, 2012 (1 page).

(Continued)

*Primary Examiner* — Alpus H Hsu
*Assistant Examiner* — Camquyen Thai
(74) *Attorney, Agent, or Firm* — Cooley LLP

(57) ABSTRACT

In some embodiments, an apparatus includes a processor configured to send an identifier to an output device such that the output device presents the identifier. The apparatus also includes a cellular communication module and a Wi-Fi communication module operatively coupled to the processor. The cellular communication module can be configured to establish a connection with a cellular network. The cellular communication module can be configured to receive, from a server via the cellular network, Wi-Fi configuration instructions in response to the server receiving the identifier and the Wi-Fi configuration instructions from a communication device. The Wi-Fi communication module can be configured to establish a connection with a Wi-Fi network based on the Wi-Fi configuration instructions. The Wi-Fi communication module can be configured to receive, from the communication device, a command configured to control content presented by the output device after the connection with the Wi-Fi network has been established.

16 Claims, 5 Drawing Sheets

(51) Int. Cl.
*H04W 88/06* (2009.01)
*H04W 84/12* (2009.01)

(56) References Cited

U.S. PATENT DOCUMENTS

| | | | |
|---|---|---|---|
| 6,029,164 A | 2/2000 | Birrell et al. | |
| 6,085,100 A | 7/2000 | Tarnanen | |
| 6,151,507 A | 11/2000 | Laiho et al. | |
| 6,169,911 B1 | 1/2001 | Wagner et al. | |
| 6,178,331 B1 | 1/2001 | Holmes et al. | |
| 6,263,365 B1 | 7/2001 | Scherpbier | |
| 6,309,305 B1 | 10/2001 | Kraft | |
| 6,346,952 B1 | 2/2002 | Shtivelman | |
| 6,630,944 B1 | 10/2003 | Kakuta et al. | |
| 6,727,916 B1 | 4/2004 | Ballard | |
| 6,826,596 B1 | 11/2004 | Suzuki | |
| 6,847,974 B2 | 1/2005 | Wachtel | |
| 7,024,556 B1 | 4/2006 | Hadjinikitas et al. | |
| 7,028,263 B2 | 4/2006 | Maguire | |
| 7,356,833 B2 | 4/2008 | Byrne | |
| 7,484,177 B2 | 1/2009 | Maguire | |
| 7,493,616 B2 | 2/2009 | Yach et al. | |
| 7,515,036 B2* | 4/2009 | McClenny et al. | 340/286.02 |
| 7,522,549 B2 | 4/2009 | Karaoguz et al. | |
| 7,570,655 B2 | 8/2009 | Hassan et al. | |
| 7,581,244 B2 | 8/2009 | Li et al. | |
| 7,583,965 B2 | 9/2009 | Caspi et al. | |
| 7,761,861 B2 | 7/2010 | Bentz et al. | |
| 7,818,005 B2 | 10/2010 | Caspi et al. | |
| 7,827,497 B2 | 11/2010 | Maguire | |
| 7,840,631 B2 | 11/2010 | Farcasiu | |
| 7,991,399 B2* | 8/2011 | Ganesan | 455/436 |
| 7,992,197 B2 | 8/2011 | Naaman et al. | |
| 8,055,899 B2 | 11/2011 | Levy et al. | |
| 8,060,016 B2* | 11/2011 | Jung et al. | 455/41.2 |
| 8,156,197 B1 | 4/2012 | Livingston et al. | |
| 8,359,062 B2* | 1/2013 | Tu et al. | 455/552.1 |
| 2002/0170047 A1 | 11/2002 | Swetland | |
| 2004/0025022 A1 | 2/2004 | Yach et al. | |
| 2004/0215830 A1 | 10/2004 | Shenfield | |
| 2005/0091693 A1* | 4/2005 | Amine et al. | 725/100 |
| 2007/0076696 A1* | 4/2007 | An et al. | 370/352 |
| 2007/0089110 A1* | 4/2007 | Li | 717/178 |
| 2007/0256135 A1* | 11/2007 | Doradla et al. | 726/26 |
| 2008/0098225 A1 | 4/2008 | Baysinger | |
| 2008/0108308 A1* | 5/2008 | Ullah | 455/41.2 |
| 2008/0134342 A1 | 6/2008 | Shamoon et al. | |
| 2008/0151842 A1* | 6/2008 | Tysowski et al. | 370/338 |
| 2008/0160492 A1 | 7/2008 | Campbell et al. | |
| 2008/0167954 A1 | 7/2008 | Kawakami | |
| 2008/0172285 A1 | 7/2008 | Hurowitz et al. | |
| 2008/0244679 A1* | 10/2008 | Sukumar et al. | 725/121 |
| 2008/0281977 A1 | 11/2008 | Branam et al. | |
| 2008/0282191 A1 | 11/2008 | Branam et al. | |
| 2009/0047989 A1* | 2/2009 | Harmon et al. | 455/550.1 |
| 2009/0049297 A1 | 2/2009 | Omernick et al. | |
| 2009/0124284 A1* | 5/2009 | Scherzer et al. | 455/552.1 |
| 2009/0168676 A1 | 7/2009 | Olson | |
| 2009/0193266 A1 | 7/2009 | Gable et al. | |
| 2009/0298535 A1* | 12/2009 | Klein et al. | 455/556.1 |
| 2010/0304730 A1* | 12/2010 | Huang et al. | 455/419 |
| 2011/0119720 A1* | 5/2011 | Fan et al. | 725/109 |
| 2011/0169913 A1* | 7/2011 | Karaoguz et al. | 348/42 |
| 2011/0224992 A1* | 9/2011 | Chaoui et al. | 704/500 |
| 2012/0005311 A1 | 1/2012 | Livingston et al. | |
| 2012/0016989 A1* | 1/2012 | Fuller | 709/225 |
| 2012/0166604 A1* | 6/2012 | Fortier et al. | 709/223 |
| 2012/0167126 A1* | 6/2012 | Paek et al. | 725/14 |
| 2012/0260282 A1* | 10/2012 | Dasher et al. | 725/37 |
| 2013/0162160 A1* | 6/2013 | Ganton et al. | 315/210 |

FOREIGN PATENT DOCUMENTS

| | | |
|---|---|---|
| CA | 2 472 474 | 12/2004 |
| EP | 0 932 130 | 7/1999 |
| WO | WO 99/49392 | 9/1999 |

OTHER PUBLICATIONS

Connecting to the Internet: Boxee Support, Nov. 8, 2010, [Online] <URL: http://support.boxes.tv/entries/323358-connecting-to-the-internet> (2 pages).

How do I setup my Boxee Box?, Nov. 9, 2010, [Online] <URL: http://support.boxee.tv/entries/325270-how-to-i-setup-my-boxee-box> (1 page).

International Search Report and Written Opinion mailed Apr. 4, 2011 for PCT/CA2010/001994, filed Dec. 21, 2010.

Final Office Action for U.S. Appl. No. 12/974,041, mailed Dec. 27, 2013.

Office Action for U.S. Appl. No. 12/974,041, mailed Aug. 11, 2014.

* cited by examiner

METHODS AND APPARATUS FOR INITIALIZING A NETWORK CONNECTION FOR AN OUTPUT DEVICE

BACKGROUND

Embodiments described herein relate generally to methods and apparatus used to initialize a network connection for an output device and, more particularly, to methods and apparatus for initializing a network connection for an output device to control content presented by the output device.

Some known systems can be used to display Internet content on a television. Such known systems typically include at least a computing device and a controller device (e.g., a remote controller). In use, the computing device can be connected to a television. The computing device can also be connected to the Internet via, for example, a Wi-Fi network. The controller device can be used to set up, initialize and/or configure the computing device such that the computing device can be connected to the Wi-Fi network. As a result, content such as web pages, movies, television shows and/or video clips can be retrieved from the Internet or other networks and displayed on the television. Such a controller device, however, is typically paired with the computing device, thus increasing the complexity and cost for the system.

Accordingly, a need exists for methods and apparatus that enables initialization of an output device without a specialized controller device.

SUMMARY

In some embodiments, an apparatus includes a processor configured to send an identifier to an output device such that the output device presents the identifier. The apparatus also includes a cellular communication module and a Wi-Fi communication module operatively coupled to the processor. The cellular communication module can be configured to establish a connection with a cellular network. The cellular communication module can be configured to receive, from a server via the cellular network, Wi-Fi configuration instructions in response to the server receiving the identifier and the Wi-Fi configuration instructions from a communication device. The Wi-Fi communication module can be configured to establish a connection with a Wi-Fi network based on the Wi-Fi configuration instructions. The Wi-Fi communication module can be configured to receive, from the communication device, a command configured to control content presented by the output device after the connection with the Wi-Fi network has been established.

DETAILED DESCRIPTION

Figure 1:
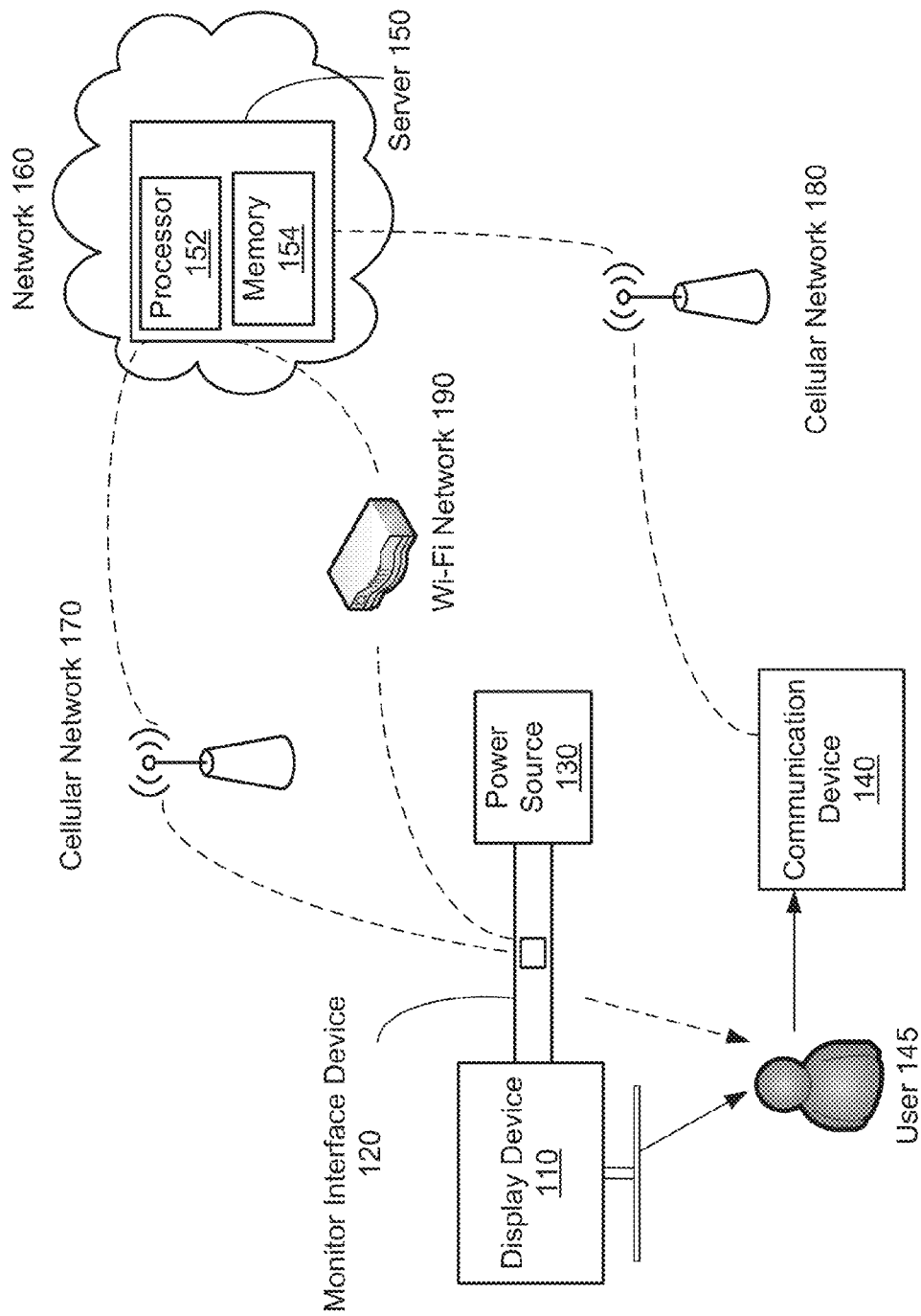
FIG. 1 is a schematic diagram that illustrates a monitor interface device interacting with a server and a communication device to initialize a network connection for a display device, according to an embodiment.

In some embodiments, an apparatus includes a processor, a cellular communication module and a Wi-Fi communication module. The processor can be configured to send an identifier to an output device (e.g., a display device, a speaker, etc.) such that the output device presents (e.g., displays, plays, etc.) the identifier. In some embodiments, the processor can be configured to send the identifier to the output device such that the output device presents the identifier as an optical pattern configured to be received by a communication device via an optical input (e.g., scanned by a communication device). In some embodiments, the processor can be configured to send the identifier to the output device such that the output device presents the identifier as an alpha-numeric identifier configured to be received by a communication device via an alpha-numeric input (e.g., entered into a communication device).

The cellular communication module can be operatively coupled to the processor, and configured to establish a connection with a cellular network. The cellular communication module can be configured to receive, from a server via the cellular network, Wi-Fi configuration instructions in response to the server receiving the identifier and the Wi-Fi configuration instructions from a communication device. In some embodiments, the cellular communication module can be configured to send, via the cellular network, a request for the identifier prior to the processor sending the identifier to the output device. In some embodiments, the cellular communication module can be configured to send, via the cellular network and prior to receiving the Wi-Fi configuration instructions, a list of Wi-Fi communication networks available to the Wi-Fi communication module to the server such that the server can provide the list to the communication device.

The Wi-Fi communication module can be operatively coupled to the processor, and configured to establish a connection with a Wi-Fi network based on the Wi-Fi configuration instructions. The Wi-Fi communication module can be configured to receive, from the communication device, a command configured to control content presented by the output device after the connection with the Wi-Fi network has been established. In some embodiments, the content presented by the output device can include a content configured to be rendered by a web-browser application after the connection with the Wi-Fi network has been established. In some embodiments, the processor can be configured to send the identifier to the output device when the connection with the Wi-Fi network is inoperable. In some embodiments, the apparatus can further include a High-Definition Multimedia Interface (HDMI) connector configured to be operatively coupled to (e.g., interface with) an HDMI connector on the output device.

In some embodiments, a non-transitory processor-readable medium stores code representing instructions to cause a processor to receive, from a communication device, an identifier associated with a monitor interface device in response to a user of the communication device perceiving the identifier presented by an output device coupled to the monitor interface device. The code represents instructions to cause the processor to associate the communication device with the monitor interface device based on the identifier. In some embodiments, the code can represent instructions to cause the processor to receive, from the monitor interface device and via the cellular network, the identifier prior to associating the communication device with the monitor interface device. In some other embodiments, the code can represent instructions to cause the processor to receive, from the monitor interface device and via the cellular network, a request for an identifier, and then send, to the monitor interface device via the cellular network, the identifier.

In some embodiments, the code can represent instructions to cause the processor to receive, from the monitor interface device and via the cellular network, a list of Wi-Fi networks available to a Wi-Fi communication module of the monitor interface device. The code can represent instructions to cause the processor to send the list of Wi-Fi networks to the communication device prior to receiving the Wi-Fi configuration instructions from the communication device.

The code represents instructions to cause the processor to receive, from the communication device, Wi-Fi configuration instructions associated with the monitor interface device. The code also represents instructions to cause the processor to send the Wi-Fi configuration instructions to the monitor interface device via a cellular network.

The code further represents instructions to cause the processor to receive, from the monitor interface device, a Wi-Fi connection acknowledgement signal via a Wi-Fi network associated with the monitor interface device. In some embodiments, the code can represent instruction to cause the processor to provide content to a web-browser application associated with the monitor interface device via the Wi-Fi network after receiving the Wi-Fi connection acknowledgement signal. In some embodiments, the code can represent instructions to cause the processor to receive, from the communication device, an instruction to control content presented by the output device. The code can further represent instructions to cause the processor to send, to the monitor interface device via the Wi-Fi network, the instruction such that the monitor interface device can control the content presented by the output device based on the instruction.

While generally shown and described herein as relating to a display device and/or a monitor, in other embodiments any suitable output device (e.g., a speaker) can be used. Additionally, while generally shown and described herein as interfacing with a display device, in some embodiments, a monitor interface device can be configured to interface with any suitable output device. For example, in some embodiments, a monitor interface device can also be configured to provide audio content for playback on a speaker or other audio presentation device.

FIG. 1 is a schematic diagram that illustrates a monitor interface device 120 interacting with a server and a communication device to initialize a network connection for a display device, according to an embodiment. The monitor interface device 120 can include a processor configured to execute modules, functions and/or processes associated with initializing a network connection and/or displaying content on the display device 110. In some embodiments, the processor included in the monitor interface device 120 can be a general purpose processor, a Field Programmable Gate Array (FPGA), an Application Specific Integrated Circuit (ASIC), a Digital Signal Processor (DSP), and/or the like. In some embodiments, the monitor interface device 120 can include one or more hardware-based modules (e.g., DSP, FPGA, ASIC) and/or software-based modules (e.g., a module of computer code to be executed at a processor, a set of processor-readable instructions that can be executed at a processor) associated with displaying content on the display device 110. Details of an example monitor interface device are further shown and described with respect to FIG. 2.

In some embodiments, the monitor interface device 120 can be coupled to and communicate with, for example, a cellular network (e.g., the cellular network 170), a Wi-Fi network (e.g., the Wi-Fi network 190), and/or any other type of networks (not shown in FIG. 1). In such embodiments, the monitor interface device 120 can have one or more communication capabilities and/or modules such that the monitor interface device can communicate with a network (e.g., the Internet) by, for example, a cellular connection, a Wi-Fi connection, a satellite connection, a Bluetooth connection and/or the like. For example, as described in further detail herein with respect to FIG. 2, the monitor interface device 120 can include a cellular communication module and a Wi-Fi communication module.

In some embodiments, cellular connection information associated with connecting the monitor interface device 120 to a default cellular network (e.g., the cellular network 170) can be stored in the monitor interface device 120 (e.g., in a memory). Thus, after the monitor interface device 120 is turned on or activated, the monitor interface device 120 can be configured to automatically establish a connection with a default cellular network.

As shown in FIG. 1, the monitor interface device 120 can be connected to a display device 110 and a power source 130. In some embodiments, the monitor interface device 120 can be connected to the display device 110 using, for example, a wire, a cable, and/or the like. In some embodiments, the monitor interface device 120 can be connected to the display device 110 via, for example, a High-Definition Multimedia Interface (HDMI) connector, a Video Graphics Array (VGA) connector, a Universal Serial Bus (USB) connector, and/or a connector compliant with any other suitable video and/or audio standard. In some embodiments and as described in further detail herein, after the monitor interface device 120 is successfully connected to the display device 110, the monitor interface device 120 can be configured to be operatively connected to, for example, a network (e.g., the Wi-Fi network 190) such that content (e.g., visual and/or audio content) can be retrieved from the Internet or other networks (e.g., an Intranet) via the Wi-Fi network and can be presented by the display device 110.

In some embodiments, the display device 110 can be, for example, a television, a liquid crystal display (LCD) monitor, a cathode ray tube (CRT) monitor, or the like. In such embodiments, the monitor interface device 120 can be configured to display content on the display device 110 using a specialized web browser application (e.g., a television based web browser, a monitor based web browser) that is compliant with the display device 110. In some other embodiments, the monitor interface device 120 can be connected to other types of output devices, such as, for example, a speaker, a printer, a digital picture frame, and/or the like. In such embodiments, the monitor interface device 120 can be configured to present content (e.g., visual content, audio content) retrieved from the Internet or other networks using any suitable application that is compliant with the output device.

The power source 130 can be any type of power supply that can provide electrical power to the monitor interface device 120. In some embodiments, the power supply 130 can be, for example, an electrical outlet (e.g., on a wall, on an extension board). In such embodiments, the monitor interface device can be coupled to and take electrical power from the power source 130 via an electrical wire. In some embodiments, the power supply 130 can be, for example, a battery pack including one or more battery cells. In such embodiments, the power supply 130 can be mounted into a portion of the monitor interface device 120.

In some embodiments, as an alternative to the power source 130, the monitor interface device 120 can receive power supply from the display device 110. In such embodiments, electrical power can be provided from the display device 110 to the monitor interface device 120 via, for example, the wire or cable that couples the display device 110 to the monitor interface device 120. Furthermore, in such embodiments the monitor interface 120 need not be connected to a power source other than the display device 110.

The server 150 can be a server device residing in the network 160 that is configured to manage and/or provide content to monitor interface devices (including the monitor interface device 120) that can access the network 160 (e.g., via the cellular network 170, via the Wi-Fi network 190). In some embodiments, the server 150 can be configured to send data to and/or receive data from one or more monitor interface devices (e.g., the monitor interface device 120) and one or more communication devices (e.g., the communication device 140). In some embodiments, the server 150 can be configured to function as, for example, a web server device, a storage device, a data repository, and/or the like in the network 160. In some embodiments, as described in further detail herein, the server 150 can be configured to forward data between the communication device 140 and the monitor interface device 120. In some embodiments, the server 150 can be configured to provide content (e.g., web pages, video clips) to the monitor interface device 120 such that the content can be presented by the display device 110.

As shown in FIG. 1, the server 150 can include a processor 152 and a memory 154. The processor 152 can be a general purpose processor, an FPGA, an ASIC, a DSP, and/or the like. The memory 154 can be, for example, a random access memory (RAM), a memory buffer, a hard drive, a database, an erasable programmable read-only memory (EPROM), an electrically erasable read-only memory (EEPROM), a read-only memory (ROM), a flash memory, a hard disk, a floppy disk, and/or so forth. In some embodiments, the server 150 can include one or more modules, functions and/or processes associated with interacting with monitor interface devices and/or communication devices, configuring monitor interface devices, and/or displaying content on display devices. Instructions associated with such modules, functions and/or processes can be stored in the memory 154 and executed at the processor 152.

The network 160 can be any type of network that can be accessed by monitor interface devices (e.g., the monitor interface device 120) and/or communication devices (e.g., the communication device 140) directly or indirectly (i.e., via another network such as a cellular network or a Wi-Fi network). The network 160 can be implemented as a wired network and/or a wireless network. The network 160 can be, for example, a local area network (LAN), a wide area network (WAN), a telecommunications network, the Internet, etc.

The communication device 140 can be any device that can be used by a user (e.g., the user 145) to communicate with a server in a network (e.g., the server 150 in the network 160). Specifically, the communication device 140 can receive input from the user 145 and exchange data with the server 150 within the network 160. In some embodiments, the communication device 140 can communicate with the server 150 via a cellular network, such as the cellular network 180. In such embodiments, the communication device 140 can have a cellular communication capability. The communication device 140 can be, for example, a cellular phone.

In some other embodiments, although not shown in FIG. 1, the communication device 140 can be a device that can be coupled to other types of networks and/or devices. In such embodiments, the communication device 140 can have, for example, a Wi-Fi communication module configured to establish a Wi-Fi connection, a satellite communication module configured to establish a satellite connection, a Bluetooth communication module configured to establish a Bluetooth connection, and/or the like. The communication device 140 can be, for example, a computing device operatively coupled to the server 150 via an Internet service provider (ISP) and the Internet, such as, for example, a smart phone, a personal digital assistant (PDA), a tablet computer, a laptop, a desktop computer, and/or so forth.

In use, after being connected to the display device 110 and the power source 130, the monitor interface device 120 can be configured to send an identifier associated with the monitor interface device 120 to the display device 110. As a result, the identifier can be displayed on the display device 110 (e.g., on a television screen, on a monitor). In other embodiments, if the display device 110 has an audio output capability, the identifier can be played as audio content via, for example, a speaker of the display device 110.

The identifier can be used to uniquely identify the monitor interface device 120, and can be in any suitable form. In some embodiments, the identifier of the monitor interface device 120 can be in an alpha-numeric format. For example, the identifier can be a unique product serial number assigned to the monitor interface device 120 when the monitor interface device 120 is produced. For another example, the identifier can be a unique Media Access Control (MAC) address associated with the monitor interface device 120. In some other embodiments, the identifier can be in an optical pattern. For example, the identifier can be a high capacity color barcode, a quick response (QR) code, a two-dimensional barcode, a one-dimensional barcode, etc.

In some embodiments, the monitor interface device 120 can be configured to retrieve the identifier from, for example, the server 150 in the network 160 prior to sending the retrieved identifier to the display device 110. In such embodiments, after being turned on or activated, the monitor interface device 120 (e.g., using a cellular communication module) can be configured to establish a connection with the server 150 via, for example, the cellular network 170 and the network 160. In some embodiments, configuration information associated with establishing a connection with the cellular network 170 can be stored within a non-volatile memory of the monitor interface device 120. Such configuration information can be retrieved after the monitor interface device 120 is activated and can be used to establish the connection with the cellular network 170.

The monitor interface device 120 can then send a request for the identifier to the server 150 via the cellular network 170 and the network 160. In response to receiving such a request, the server 150 can be configured to send the identifier that is uniquely associated with the monitor interface device 120 to the monitor interface device 120 via the network 160 and the cellular network 170. Thus, the monitor interface device 120 can receive the identifier from the server 150. The monitor interface device 120 can then send the identifier to the display device 110 such that the display device 110 presents the identifier. In some other embodiments, alternatively, the identifier can be stored within, for example, a memory of the monitor interface device 120. In such embodiments, the monitor interface device 120 can be configured to retrieve the identifier from the memory within the monitor interface device 120 after being activated. In such embodiments, the monitor interface device 120 can send an initialization signal including the identifier to the server 150 via the cellular network 170. This can allow the server 150 to associate the monitor interface device 120 with a communication device 140, as described in further detail herein.

After the identifier of the monitor interface device 120 is displayed on the display device 110, the user 145 can enter the displayed identifier into the communication device 140. In some embodiments, the identifier of the monitor interface device 120 can be entered into the communication device 140 using various suitable means. For example, if the identifier is displayed on the display device 110 as an alpha-numeric identifier (e.g., a MAC address, a serial number), the identifier can be entered into the communication device 140 by the user 145 using, for example, a keypad, a touch screen, a mouse, a camera, a microphone, or any other suitable input means. For another example, if the identifier is displayed on the display device 110 as an optical pattern (e.g., a barcode, a QR code), the identifier can be entered into the communication device 140 by the user 145 using, for example, an optical scanner or reader application on the communication device 140. For yet another example, the identifier can be audibly played via a speaker of the display device 110 as a sound that can be detected using a microphone of the communication device 140 (e.g. using a control application on the communication device 140).

In some embodiments, the user 145 can obtain the identifier directly from the monitor interface device 120, and then enter it into the communication device 140. For example, the user 145 can read and/or scan a serial number and/or a barcode of the monitor interface device 120 that is marked on the surface of the monitor interface device 120. For example, if the identifier is presented as a QR code, the user can scan the QR code using a smart phone. For another example, the user 145 can obtain a MAC address of the monitor interface device 120 on a housing of the monitor interface device 120, from a manual for the monitor interface device 120 and/or the like. In such embodiments, the identifier of the monitor interface device 140 need not be sent to and displayed at the display device 110.

In some embodiments, a control application (e.g., a control software application) can be executing in a processor (not shown) of communication device 140. In such embodiments, the user 145 can be configured to input the identifier in a graphical user interface (GUI) of the control application. As described in further detail herein, in some embodiments, the control application can also be used to control content presented by the display device 110.

After the identifier of the monitor interface device 140 is entered into the communication device 140 (e.g., using the control application), the communication device 140 can be configured to send the identifier to the server 150. In some embodiments, as shown in FIG. 1, the identifier can be sent from the communication device 140 to the server 150 via a cellular network 180. In some other embodiments, although not shown in FIG. 1, the identifier can be sent from the communication device 140 to the server 150 via other types of networks (e.g., a Wi-Fi network). Similar to the operation of sending the identifier from the communication device 140 to the server 150, in subsequent operations, other data (e.g., lists of Wi-Fi networks, Wi-Fi configuration instructions, etc.) can also be exchanged between the communication device 140 and the server 150 via the cellular network 180 and/or any other applicable networks (e.g., a Wi-Fi network, the Internet).

Although only a single communication device 140 is shown as being in communication with the server 150 in FIG. 1, in other embodiments, more than one communication device can be operatively coupled to and exchange data with the server 150 via the cellular network 180, the network 160, and/or any other network (e.g., a Wi-Fi network, the Internet, etc.) to engage in configuring a Wi-Fi connection for the monitor interface device 140 and/or displaying content on the display device 110.

In response to receiving the identifier of the monitor interface device 120 from the communication device 140, the server 150 can be configured to associate the monitor interface device 120 with the communication device 140 based on the identifier. In some embodiments, the server 150 can store information related to such an association within, for example, the memory 154 of the server 150. As a result of the server 150 associating the monitor interface device 120 with the communication device 140, in some embodiments, the monitor interface device 120 can be operatively controlled and/or configured by the user 145. In some embodiments, for example, the user 145 can use the communication device 140 to enter commands and/or instructions associated with controlling and/or configuring the monitor interface device 120 (e.g., using the control application), and the server 150 can function as a relay to forward those commands and/or instructions from the communication device 140 to the monitor interface device 120.

In some embodiments, the monitor interface device 120 can receive, via the cellular network 170, a request for a list of available Wi-Fi network(s) from the server 150. In response to receiving such a request, the monitor interface device 120 can be configured to detect Wi-Fi network(s) (e.g., the Wi-Fi network 190) available to the monitor interface device 140. The monitor interface device 120 can then be configured to send a list of those available Wi-Fi network(s) to the server 150 via, for example, the cellular network 170. In some embodiments, information associated the available Wi-Fi network(s), such as the signal strength of the available Wi-Fi network(s) as measured at the monitor interface device 120, can also be sent to the server 150 with the list of available Wi-Fi network(s).

In some embodiments, after receiving the list of available Wi-Fi network(s) and associating the monitor interface device 120 with the communication device 140, the server 150 can be configured to send the list of available Wi-Fi network(s), as well as information associated with the available Wi-Fi network(s), to the communication device 140. Similar to the identifier of the monitor interface device 120 that is sent from the communication device 140 to the server 150, the list of available Wi-Fi network(s) can be sent from the server 150 to the communication device 140 via, for example, the cellular network 180 and/or any other suitable network.

Based on the received list of available Wi-Fi network(s) and the associated information, the user 145 can decide to which Wi-Fi network the monitor interface device 120 should be connected. Similarly stated, the list of available Wi-Fi network(s) can be presented to the user 145 using the communication device 140. In some embodiments, the list of available Wi-Fi network(s) can be presented to the user 145 within the GUI of the control application. The user can select a Wi-Fi network from the list of available Wi-Fi network(s).

In other embodiments, the communication device 140 can be configured to detect and collect information associated with available Wi-Fi network(s) (e.g. using the control application) instead of or in addition to the monitor interface device 120. In such embodiments, for example, the communication device 140 can scan for nearby Wi-Fi network(s) and can present a list of the available Wi-Fi network(s) to the user. If, for example, the user is in an area nearby the monitor interface device 120, the user can assume that the available Wi-Fi network(s) are also available to the monitor interface device 120.

The user 145 can use the communication device 140 to send Wi-Fi configuration instructions, which are associated with connecting the monitor interface device 120 to the desired Wi-Fi network, to the server 150. The user 145 can input the Wi-Fi configuration instructions into the communication device 140 using, for example, a keypad, a mouse, touchtone keys, a touch screen, a camera, a microphone, and/or any other suitable input means. In some embodiments, the Wi-Fi configuration instructions can include, for example, a name, a service set identifier (SSID), a wireless access point (WAP) key, and/or a password associated with the selected Wi-Fi network.

For example, as shown in FIG. 1, after a list of available Wi-Fi network(s) is received and displayed at the communication device 140, the user 145 can decide to connect the monitor interface device 120 to the Wi-Fi network 190. Thus, the user 145 can enter Wi-Fi configuration instructions associated with the Wi-Fi network 190 into the communication device 140. The communication device 140 can then send the Wi-Fi configuration instructions to the server 150. As described above, such Wi-Fi configuration instructions can include, for example, a name, an SSID, a WAP key, and/or a password for the Wi-Fi network 190.

In some embodiments, the user 145 can provide information associated with a desired Wi-Fi network for the monitor interface device 120 without a list of available Wi-Fi network(s) or any other information associated with Wi-Fi network(s) available to the monitor interface device 120. In such embodiments, the communication device 140 need not receive a list of available Wi-Fi network(s) and/or other associated information from the monitor interface device 120.

In response to receiving the Wi-Fi configuration instructions from the communication device 140, the server 150 can be configured to forward the Wi-Fi configuration instructions to the monitor interface device 120 via the cellular network 170. As a result, the monitor interface device 120 can use the received Wi-Fi configuration instructions to establish a connection with the selected Wi-Fi network (e.g., using a Wi-Fi communication module). Furthermore, in some embodiments, the monitor interface device 120 can be configured to send a Wi-Fi connection acknowledgement signal to the server 150 via the Wi-Fi network to which the monitor interface device 120 is connected.

For example, as shown in FIG. 1, in response to receiving the Wi-Fi configuration instructions from the communication device 140 via the server 150, the monitor interface device 120 can be configured to execute and/or implement the Wi-Fi configuration instructions. As a result, the monitor interface device 120 can establish a connection with the Wi-Fi network 190. In some embodiments, the monitor interface device 120 can then be configured to send a Wi-Fi connection acknowledgement signal to the server 150, indicating that the monitor interface device has successfully established a connection with the Wi-Fi network 190. Thus, the monitor interface device 120 can establish a connection with the network 160 and/or other networks (e.g., the Internet) via the Wi-Fi network 190.

After the monitor interface device 120 has successfully established a connection with the Wi-Fi network 190, the user 145 can send one or more commands associated with content displayed on the display device 110 to the monitor interface device 120. Specifically, the user 145 can input (e.g., enter using a keypad, select on a touch screen, etc.) commands into the communication device 140. The communication device 140 can be configured to send the commands to the server 150 via, for example, the cellular network 180. In some embodiments, the commands can be executed at the server 150 and/or the monitor interface device 120. Thus, in some embodiments, the server 150 can be configured to execute some commands and can be configured to forward other commands to the monitor interface device 120 via the Wi-Fi network 190 or the cellular network 170 for execution at the monitor interface device 120.

In some embodiments, the commands received and executed at the server 150 can include commands associated with retrieving and sending content (e.g., visual content, audio content, video content) to the monitor interface device 120. As a result of executing such commands at the server 150, the requested content can be retrieved from, for example, resources within the network 160 and/or other networks (e.g., the Internet). The server 150 can then be configured to send the retrieved content to the monitor interface device 120 via the Wi-Fi network 190.

In some embodiments, the commands received and executed at the monitor interface device 120 can include commands associated with executing a web browser application (e.g., a television based web browser, a monitor based web browser) at the monitor interface device 120. As a result of executing such commands at the monitor interface device 120, the web browser application can be set up and/or activated. In some embodiments, the web browser application can be further configured to display content on the display device 110.

In some embodiments, the commands received and executed at the monitor interface device 120 can include commands associated with displaying retrieved content at the display device 110 using the web browser application and/or any other suitable application. As a result of executing such commands, the monitor interface device 120 can be configured to send the associated content to the display device 110, such that the associated content can be displayed at the display device 110. In such embodiments, the content sent from the monitor interface device 120 to the display device 110 can be in any suitable format. For example, the content can be in a format suitable to be displayed in a web browser or using other suitable applications.

In some embodiments, the retrieved content can be displayed at the display device 110 using a web browser application and/or other types of applications, such as, for example, a media player, a video player, an audio player, and/or the like. In such embodiments, based on the commands received from the user 145 (via the communication device 140 and the server 150), the monitor interface device 120 can be configured to activate and execute the suitable application. Furthermore, the content sent from the monitor interface device 120 to the display device 110 can be in a suitable format to be presented by that display application.

In some embodiments, the commands received and executed at the monitor interface device 120 can include commands associated with controlling the content displayed at the display device 110. As a result of executing such commands, the monitor interface device 120 can be configured to control the content displayed at the display device 110. For example, the monitor interface device 120 can be configured to pause, fast forward, rewind, and/or stop a video clip and/or an audio track played at the display device 110 based on the received commands. For another example, the monitor interface device 120 can be configured to zoom in, zoom out, focus or defocus an image displayed at the display device 110 based on the received commands. In some embodiments, the content displayed at the display device 110 can be controlled and/or manipulated similar to content displayed in a web browser on a computer screen.

In some embodiments, the commands received and executed at the monitor interface device 120 can include commands associated with navigating the content displayed at the display device 110. As a result of executing such commands, the monitor interface device 120 can be configured to navigate the content displayed at the display device 110. For example, the monitor interface device 120 can be configured to retrieve a new web page by selecting (e.g., using the communication device) a Hypertext Transfer Protocol (HTTP) link displayed on the display device 110. For another example, the monitor interface 120 can be configured to move forward to the next web page or move backward to the previous web page by selecting (e.g., using the communication device) corresponding navigation buttons shown on the display device 110 and/or on the communication device 140. In some embodiments, the content displayed (e.g., in a web browser application) at the display device 110 can be navigated similar to content displayed in a web browser on a computer screen.

In some embodiments, the user 145 can control the content displayed on the display device 110 in an interactive fashion. Specifically, based on the content displayed at the display device 110, the user 145 can enter a command into the communication device 140. The command can be intended to change and/or modify the content displayed at the display device 110. The command can then be sent from the communication device 140 to the monitor interface device 120 via, for example, the cellular network 180, the server 150 (within the network 160) and the Wi-Fi network 190. As a result of the command being executed at the monitor interface device 120, the content displayed at the display device 110 can be changed and/or modified accordingly. In such embodiments, the communication device 140 can function as an input device (e.g., a remote) for the content displayed on the display device 110.

Furthermore, in some embodiments, the content displayed on the display device 110 can include, for example, a prompt for an instruction from the user 145, a tip for the user 145 to control the content using a command, and/or the like. For example, after a video clip is played at the display device 110, a message asking whether a viewer wants to play another video clip or replay a current video clip can be displayed on the display device 110. To elect an option, the user 145 can be prompted to enter a number on a keypad of the communication device 140 (e.g., a cellular phone). For example, entering 1 can indicate to play another video clip and entering 0 can indicate to replay a current video clip. Such a command can be sent from the communication device 140 to the monitor interface device 120 via the cellular network 180, the server 150 and the Wi-Fi network 190. In response to receiving the command, the monitor interface device 120 can be configured to control the content displayed at the display device 110 accordingly (e.g., play another video clip or replay a current video clip).

For another example, in some embodiments, when a movie is played within the web browser on the display device 110, one or more tips and/or suggestions can be displayed in a corner of the screen of the display device 110. Such tips and/or suggestions can indicate to a viewer how to fast forward and/or pause the movie. The user 145 can be instructed to enter a number on a keypad of the communication device 140 (e.g., a cellular phone). For example, entering 1 can indicate to fast forward the movie and entering 0 can indicate to pause the movie. Such a command can be sent from the communication device 140 to the monitor interface device 120 via the cellular network 180, the server 150 and the Wi-Fi network 190. In response to receiving the command, the monitor interface device 120 can be configured to control the content displayed at the display device 110 accordingly (e.g., fast forward the movie or pause the movie).

In other embodiments, the GUI of the control application on the communication device 140 can present the user 145 with an interface having commands and/or options that allow the user to control the content on the display device 110. For example, if the content on the display device is a video, the control application can present a play option, a pause option, a stop option, a volume control option, a fast forward option, a rewind option, and/or the like. For another example, if the content on the display device is a web browser application, the control application can present navigation commands and/or options to the user 145. For example, the navigation commands and/or options can include a back navigation button, a forward navigation button, a search field, a uniform resource locator (URL) navigation field, and/or the like.

In some embodiments, when the connection between the monitor interface device 120 and the Wi-Fi network 190 is inoperable due to some reason (e.g., the Wi-Fi network 190 is down, the signal strength is too low), an indication that the Wi-Fi connection has been interrupted can be generated at the monitor interface device 120. Based on such an indication, the monitor interface device 120 can be configured to send the identifier of the monitor interface device 120 to the display device 110. The identifier can then be displayed on the screen of the display device 110. As a result, the user 145 can be aware of the situation and act accordingly. In some embodiments, the user 145 can, for example, repeat the configuration procedure as described herein to search for and reconnect the monitor interface device 120 to another available Wi-Fi network.

In other embodiments, the user can configure the monitor interface device 120 to use the cellular network 170 to provide content in the event that the Wi-Fi network 190 is inoperable. In such embodiments, the cellular network 170 can be configured to provide content as well set-up information (e.g., an identifier) to the monitor interface device 120.

In some embodiments, the monitor interface device 120 can be configured to be operatively coupled and/or connected to other network enabled devices (e.g. media servers, communication devices, automobiles, other network enabled monitor interface devices, etc.). In some embodiments, such a connection can be via a Wi-Fi network. In other embodiments, such a connection can be via any other suitable network, such as, for example, a cellular network, a satellite network, a Bluetooth connection, and/or the like. In some embodiments, the monitor interface device 120 can be operatively coupled to such devices to establish a relay-hop network used to access content via a given network enabled device and/or used to access the server 150 via a given network enabled device (e.g., a router).

Figure 2:
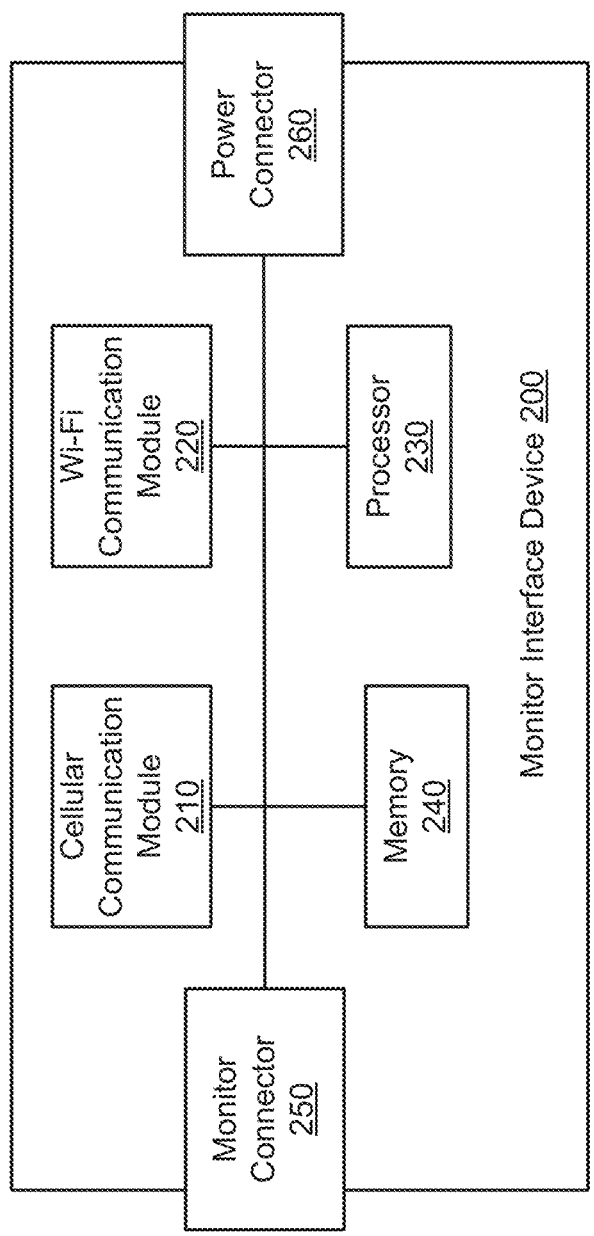
FIG. 2 is a system block diagram of a monitor interface device, according to an embodiment.

FIG. 2 is a system block diagram of a monitor interface device 200, according to an embodiment. The monitor interface device 200 can be structurally and functionally similar to the monitor interface device 120 shown and described with respect to FIG. 1. Specifically, the monitor interface device 200 can be configured to operatively couple a display device (e.g., the display device 110 in FIG. 1) to a server in a network (e.g., the server 150 in the network 160 in FIG. 1). Furthermore, the monitor interface device 200 can be configured to retrieve content to be displayed on that display device.

As shown in FIG. 2, the monitor interface device 200 includes a processor 230, a memory 240, a monitor connector 250, a power connector 260, a cellular communication module 210, and a Wi-Fi communication module 220. Each of the components shown in FIG. 2 can be directly or operatively coupled to each other. In some embodiments, the processor 230 can be configured to control operations of the cellular communication module 210 and the Wi-Fi communication module 220. The processor 230 can also be configured to retrieve data from and write data into the memory 240.

The memory 240 can be, for example, a RAM, a memory buffer, a hard drive, a database, an EPROM, an EEPROM, a ROM, a flash memory, a hard disk, a floppy disk, and/or so forth. In some embodiments, as described with respect to FIG. 3, the memory 240 can store instructions to cause the processor 230 to execute modules, processes and/or functions associated with executing a web browser application for the display device connected to the monitor interface device 200.

The processor 230 can be any suitable processing device configured to run and/or execute modules associated with executing the web browser application for the display device connected to the monitor interface device 200. More specifically, as described in further detail herein, the processor 230 can be configured to execute modules, functions and/or processes to operatively couple the display device to, for example, a server in a network; to retrieve content from the server; and to display the retrieved content at the display device using the web browser application. In some embodiments, the processor 230 can be a general purpose processor, an FPGA, an ASIC, a DSP, and/or the like.

The monitor connector 250 can be any type of interface that can connect the monitor interface device 200 to a display device (e.g., a television, a monitor) such that content can be transmitted from the monitor interface device 200 to the display device via the monitor connector 250. In some embodiments, the monitor connector 250 can be, for example, an HDMI connector, a VGA connector, a USB connector, or any other suitable connector. In such embodiments, the monitor connector 250 can be connected to a corresponding connector on the display device. In some embodiments, the monitor connector 250 is directly connected to the display device. In other embodiments, a separate cable can be used to connect the monitor connector to the display device.

In some embodiments, the monitor connector 250 can be configured to transmit audio content to an output device (e.g., a speaker) connected to the monitor interface device 200. In some other embodiments, although not shown in FIG. 2, the monitor interface device 200 can include an audio connector configured to connect the monitor interface device 200 to an audio output device.

The power connector 260 can be any type of interface that can connect the monitor interface device 200 to a power supply (e.g., an electrical outlet) such that electrical power can be provided from that power supply to the monitor interface device 200 via the power connector 260. In some embodiments, for example, the power connector 260 can be complementary with and configured to be plugged into a wall outlet. Thus, in some embodiments, an end portion of the monitor interface device 200 can be directly connected to a power source. In other embodiments, the power connector 260 can be connected to the power supply using, for example, a separate power cord.

In some embodiments, the monitor interface device 200 can receive, via the monitor connector 250, power from the display device connected to the monitor interface device 200. In such embodiments, for example, the monitor connector 250 can be an HDMI connector or a USB connector configured to receive power from an attached monitor. In such embodiments, the monitor interface device 200 need not be connected to an external power supply. In other embodiments and as described with respect to FIG. 1, the monitor interface device 200 can be equipped with and supported by a battery pack (including one or more battery cells).

The cellular communication module 210 and the Wi-Fi communication module 220 can be hardware-based modules (e.g., a DSP, an FPGA, an ASIC), software-based modules (e.g., a module of computer code to be stored in a memory (e.g., memory 240) and executed at a processor (e.g., processor 230), a set of processor-readable instructions that can be executed at a processor), or a combination of both. Although not shown in FIG. 2, in some embodiments, one or more functions associated with coupling the display device to the server and/or initializing the Wi-Fi connection can be included in modules other than the two modules shown in FIG. 2.

Similar to the monitor interface device 120 shown and described with respect to FIG. 1, the monitor interface device 200 can be configured to, among other functions, display content on the display device connected to the monitor interface device 200. More specifically, the monitor interface device 200 can be configured to establish a connection with a Wi-Fi network; operatively couple the display device to a server via the Wi-Fi network; retrieve content; and display the retrieved content at the display device. The cellular communication module 210, the Wi-Fi communication module 220, and/or other modules (not shown in FIG. 2) can be collectively configured to execute such an operation.

The cellular communication module 210 can enable the monitor interface device 200 to be connected to a cellular network (e.g., the cellular network 170 or 180 in FIG. 1). In some embodiments, the cellular communication module 210 can include, for example, a baseband processor, a transceiver antenna (or a transmit antenna and a receiver antenna), and/or other components that enable the cellular communication module 210 to be connected to a cellular network. In some embodiments, the cellular communication module 210 can be configured to connect the monitor interface device 200 to, for example, a GSM (Global System for Mobile Communications) cellular network, a CDMA (code division multiple access) cellular network, an HSPA (High Speed Packet Access) cellular network, an LTE (long term evolution) cellular network, and/or other type of cellular networks.

As shown and described with respect to FIG. 1, prior to the monitor interface device 200 being connected to a Wi-Fi network, the cellular communication module 210 can be configured to communicate with a server (e.g., the server 150 in FIG. 1) via a cellular network. In some embodiments, after the monitor interface device 200 is turned on or activated, cellular communication module 210 can be configured to establish a connection with the server via the cellular network. As a result, the monitor interface device 200 can be configured to transmit data and/or information to and/or receive data and/or information from the server via the cellular network.

For example, in some embodiments, the cellular communication module 210 can be configured to send a request for an identifier to the server via the cellular network. In response to receiving such a request, the server can send the identifier to the cellular communication module 210 via the cellular network. For another example, in some embodiments, the cellular communication module 210 can be configured to send a list of available Wi-Fi network(s) to the server via the cellular network. Furthermore, in some embodiments, the cellular communication module 210 can be configured to receive Wi-Fi configuration instructions from the server via the cellular network. For yet another example, when the Wi-Fi connection for the monitor interface device 200 is inoperable, the cellular communication module 210 can be configured to exchange instructions, commands and/or information with the server via the cellular network, such that the monitor interface device 120 can maintain a connection with the server without a Wi-Fi connection.

The Wi-Fi communication module 220 can enable the monitor interface device 200 to be connected to a Wi-Fi network (e.g., the Wi-Fi network 190 in FIG. 1). The Wi-Fi communication module 220 can include, for example, a Wi-Fi antenna, a Wi-Fi circuit module, and/or other components that enable the Wi-Fi communication module 220 to be connected to a Wi-Fi network. As shown and described with respect to FIG. 1, the Wi-Fi communication module 220 can be configured to detect Wi-Fi network(s) available to the monitor interface device 200. After Wi-Fi configuration instructions are received at the monitor interface device 200 from a server (e.g., via a cellular network), the Wi-Fi communication module 220 can be configured based on the Wi-Fi configuration instructions. As a result, the Wi-Fi communication module 220 can be connected to a desired Wi-Fi network. Thus, the monitor interface device 200 can be configured to exchange data, commands, instructions and/or information with the server via the Wi-Fi network. For example, the Wi-Fi communication module 220 can be configured to receive commands and/or instructions from the server via the Wi-Fi network. The received commands and/or instructions can be associated with, for example, retrieving content from the server, executing a web browser application for the display device connected to the monitor interface device 200, controlling content displayed at the display device, and/or so forth. As used herein, a Wi-Fi network can include any suitable wireless network (e.g., a local area networks (LAN), a wide area networks (WAN), etc.), including those described by the IEEE (Institute of Electrical and Electronic Engineers) 802 standards. In other embodiments, any other suitable wireless networking protocol (e.g., a satellite network, Bluetooth, etc.) can be used instead of or in addition to a Wi-Fi network.

In some embodiments, although not shown in FIG. 2, the monitor interface device 200 can include one or more communication modules other than the cellular communication module 210 and the Wi-Fi communication module 220, which enable the monitor interface device 200 to be connected to other types of communication networks or other devices. For example, the monitor interface device 200 can include a satellite communication module that enables the monitor interface device 200 to be connected to a satellite communication network. For another example, the monitor interface device 200 can include a Bluetooth communication module that enables the monitor interface device 200 to be connected to a Bluetooth-capable device using Bluetooth. In such embodiments, the satellite communication module and/or the Bluetooth communication module can be included in the monitor interface device 200 instead of or in addition to the cellular communication module 210 and/or the Wi-Fi communication module 220. Accordingly, in some embodiments, instead of using a cellular connection to initialize the Wi-Fi connection for the network device, a satellite connection and/or a Bluetooth connection can be used. Additionally, in some embodiments, instead of initializing a Wi-Fi connection for receiving content from a server, a satellite connection and/or a Bluetooth connection can be initialized such that content can be provided to the monitor interface device via the satellite connection and/or the Bluetooth connection.

Figure 3:
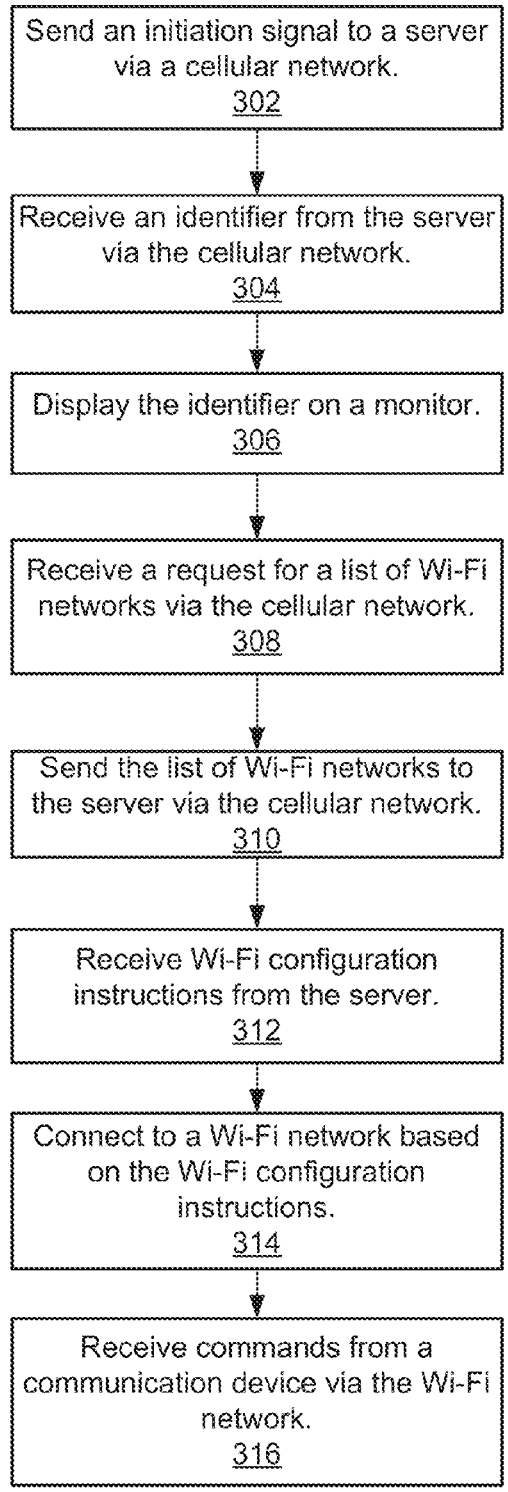
FIG. 3 is a flow chart illustrating a configuration process performed by a monitor interface device to initialize a network connection for a display device, according to an embodiment.

FIG. 3 is a flow chart illustrating a configuration process 300 performed by a monitor interface device, according to an embodiment. Such a process can be executed by a processor of the monitor interface device (e.g., the processor 230 of the monitor interface device 200 in FIG. 2). In some embodiments, the monitor interface device can have a non-transitory processor-readable medium (e.g., the memory 240 in FIG. 2), which can store code representing instructions to be executed by the processor of the monitor interface device. The stored code can include code to cause the processor to perform the process 300.

At 302, an initiation signal can be sent to a server via a cellular network. Specifically, after the monitor interface device is turned on or activated, the monitor interface device can be configured to establish a connection with a server in a network (e.g., the Internet) via a cellular network. The monitor interface device can then be configured to generate and send an initiation signal to the server via the cellular network. In some embodiments, the initiation signal can include, for example, a request for an identifier associated with the monitor interface device. As described herein, the identifier can be in any suitable format (e.g., an optical pattern, an alpha-numeric identifier) that can uniquely identify the monitor interface device.

In the example of FIG. 1, after the monitor interface device 120 is turned on or activated, the monitor interface device 120 can be configured to establish a connection with the server 150 in the network 160 via the cellular network 170. The monitor interface device 120 can then be configured to generate and send an initiation signal to the server 150 via the cellular network 170. In some embodiments, the initiation signal can include, for example, a request for an identifier associated with the monitor interface device 120, which can uniquely identify the monitor interface device 120.

At 304, an identifier can be received from the server via the cellular network. In some embodiments, the identifier can be sent from the server to the monitor interface device via the cellular network in response to a request for the identifier being received at the server. In some other embodiments, the identifier can be sent from the server to the monitor interface device via the cellular network after the server is operatively connected to the monitor interface device. In some embodiments, alternatively, the identifier can be stored in, for example, a memory of the monitor interface device. In such embodiments, the identifier can be retrieved from the memory of the monitor interface device rather than being received from any other device such as the server.

In the example of FIG. 1, the monitor interface device 120 can be configured to receive the identifier associated with the monitor interface device 120 via the cellular network 170. In some embodiments, such an identifier can be received in response to the request for the identifier being sent from the monitor interface device 120 to the server 150 (e.g., included in the initiation signal). In some other embodiments, the identifier can be retrieved from a memory of the monitor interface device 120.

At 306, the identifier can be displayed on a monitor. The monitor can be a monitor of a display device (e.g., a television) or any other output device (e.g., a computer, a printer, a projector, etc.). The identifier can be displayed on the monitor in any suitable format, such as, for example, an optical pattern (e.g., a barcode, a QR code), an alpha-numeric pattern (e.g., a MAC address, a serial number). Furthermore, as described with respect to FIG. 1, the displayed identifier can be entered into a communication device (e.g., a cellular phone) by a user. The identifier can then be sent from the communication device to the server via, for example, a cellular network. As a result, the server can be configured to associate the monitor interface device with the communication device.

In the example of FIG. 1, the monitor interface device 120 can be configured to send its identifier to the display device 110. The identifier can then be displayed on the monitor of the display device 110. After obtaining the displayed identifier, the user 145 can enter the identifier into the communication device 140 using any suitable means (e.g., a keypad, a mouse, a touch screen, a camera, a microphone, a scanner, etc.). The identifier can then be sent from the communication device 140 to the server 150 via, for example, the cellular network 180. As a result, the server 150 can be configured to associate the monitor interface device 120 with the communication device 140.

At 308, a request for a list of Wi-Fi networks can be received via the cellular network. After the server associates the monitor interface device with the communication device, the server can be configured to send a request for a list of Wi-Fi networks to the monitor interface device via the cellular network to which the monitor interface device is connected. Such a request can instruct the monitor interface device to detect and collect information associated with Wi-Fi network(s) available to the monitor interface device.

In the example of FIG. 1, after the server 150 associates the monitor interface device 120 with the communication device 140, the server 150 can be configured to send a request for a list of Wi-Fi networks to the monitor interface device 120 via the cellular network 170. In response to receiving such a request, the monitor interface device 120 can be configured to detect and collect information associated with Wi-Fi network(s) available to the monitor interface device 120.

At 310, the list of Wi-Fi networks can be sent to the server via the cellular network. Specifically, the list of available Wi-Fi network(s) detected by the monitor interface device can be sent to the server via the cellular network. In some embodiments, other information associated with the available Wi-Fi network(s), such as signal strength of the available Wi-Fi network(s), can be included in the list sent to the server. The list of available Wi-Fi network(s) can then be sent from the server to the communication device via the cellular network.

In the example of FIG. 1, the monitor interface device 120 can be configured to detect available Wi-Fi network(s) (e.g., the Wi-Fi network 190), and generate a list of the available Wi-Fi network(s). The monitor interface device 120 can then be configured to send the list of available Wi-Fi network(s) to the server 150 via the cellular network 170. The server 150 can be configured to forward the list to the communication device 140 via the cellular network 180.

At 312, Wi-Fi configuration instructions can be received from the server. After obtaining the list of available Wi-Fi network(s) using the communication device, the user can select a desired Wi-Fi network for the monitor interface device from the list of available Wi-Fi network(s) based on the information provided in the list of available Wi-Fi network(s). Specifically, the user can enter Wi-Fi configuration instructions associated with connecting the monitor interface device to the desired Wi-Fi network into the communication device. The Wi-Fi configuration instructions can then be sent from the communication device to the server via the cellular network.

In the example of FIG. 1, after obtaining the list of available Wi-Fi network(s) and/or associated information using the communication device 140, the user 145 can select the Wi-Fi network 190 as the desired Wi-Fi network for the monitor interface device 120. The user 145 can enter Wi-Fi configuration instructions associated with connecting the monitor interface device 120 to the Wi-Fi network 190 into the communication device 140. The Wi-Fi configuration instructions can then be sent from the communication device 140 to the server 150 via the cellular network 180.

At 314, the monitor interface device can be connected to a Wi-Fi network based on the Wi-Fi configuration instructions. Specifically, the Wi-Fi configurations instructions can be received (e.g., by a Wi-Fi communication module such as the Wi-Fi communication module 220 in FIG. 2) and then implemented at the monitor interface device. As a result, the monitor interface device can establish a connection with the desired Wi-Fi network. In some embodiments, after the monitor interface device establishes a connection with a Wi-Fi network, the monitor interface device can be configured to send a Wi-Fi connection acknowledgement signal to the server.

In the example of FIG. 1, the Wi-Fi configuration instructions associated with connecting the monitor interface device 120 to the Wi-Fi network 190 can be sent from the server 150 to the monitor interface device 120. The Wi-Fi configuration instructions can be implemented at the monitor interface device 120. As a result, the monitor interface device 120 can establish a connection with the Wi-Fi network 190 as instructed in the Wi-Fi configuration instructions. In some embodiments, the monitor interface device 120 can be configured to send a Wi-Fi connection acknowledgement signal to the server 150 after the connection is established.

At 316, commands can be received from the communication device via the Wi-Fi network. After the monitor interface device is connected to the Wi-Fi network, the monitor interface device can exchange data with the server via the Wi-Fi network. The user can enter commands into the communication device associated with displaying content on the monitor (e.g., a television monitor) connected to the monitor interface device. The communication device can be configured to send the commands to the server via, for example, a cellular network or a Wi-Fi network. The server can be configured to send the commands to the monitor interface device via the Wi-Fi network. As a result, the commands can be executed at the monitor interface device. In some embodiments, as described with respect to FIG. 1, the commands can be associated with, for example, retrieving video, visual, and/or audio content from the server or other resources via the Wi-Fi network; executing a web browser application at the monitor interface device; displaying the retrieved content on the monitor using the web browser application; controlling displayed content; and/or so forth.

In the example of FIG. 1, the user 145 can enter commands into the communication device 140 associated with displaying content on the display device 110. The communication device 140 can be configured to send the commands to the server 150 via, for example, the cellular network 180. The server 150 can be configured to send the commands to the monitor interface device 120 via the Wi-Fi network 190. As a result, the commands can be executed at the monitor interface device 120. In some embodiments, the commands can be associated with, for example, retrieving video, visual, and/or audio content from the server 150 or other resources via the Wi-Fi network 190; executing a web browser application at the monitor interface device 120; displaying the retrieved content on the display device 110 using the web browser application; controlling displayed content; and/or so forth.

Figure 4:
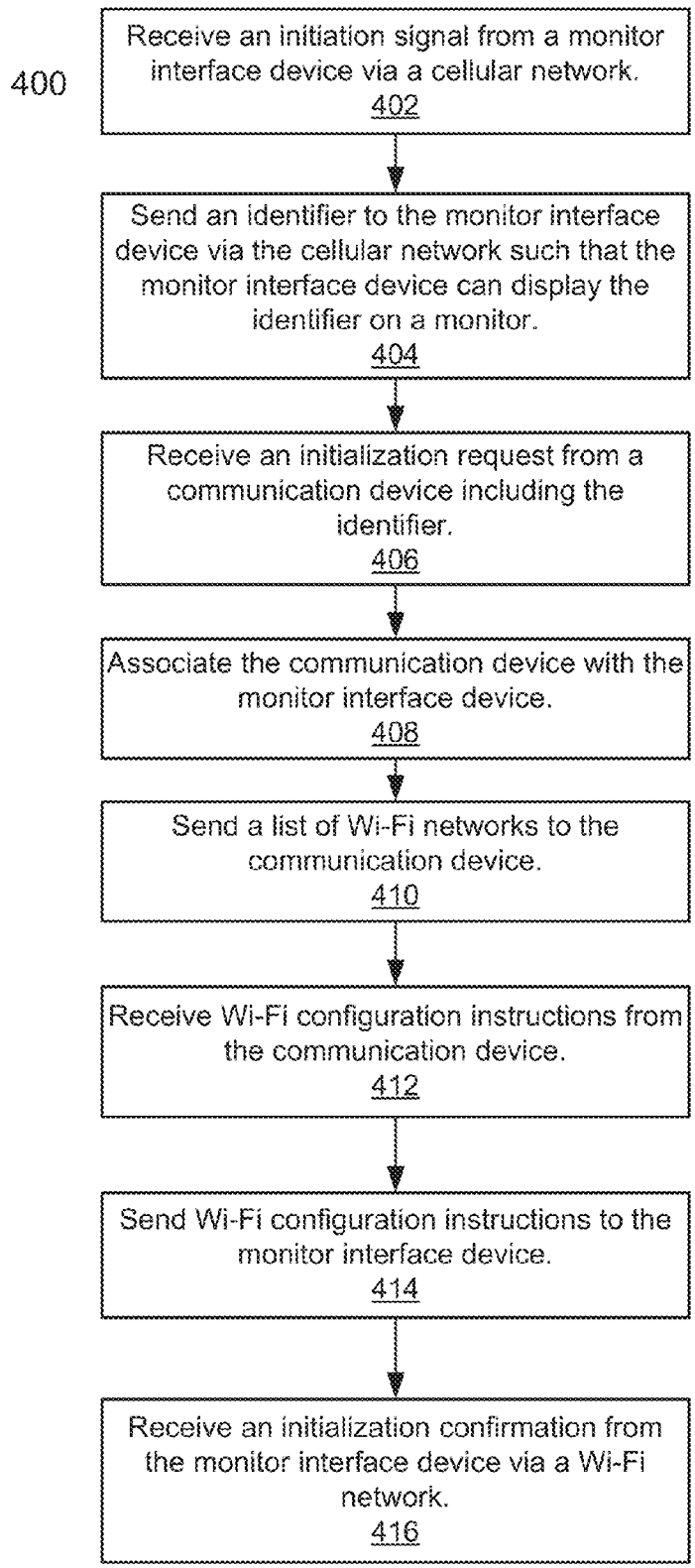
FIG. 4 is a flow chart illustrating a configuration process performed by a server device to initialize a network connection for a display device, according to an embodiment.

FIG. 4 is a flow chart illustrating a configuration process 400 performed by a server device, according to an embodiment. Such a process can be executed and/or performed by a processor (e.g., the processor 152 in FIG. 1) of the server device (e.g., the server 150 in FIG. 1). In some embodiments, the server device can have a non-transitory processor-readable medium (e.g., the memory 154 in FIG. 1), which can store code representing instructions to be executed by the processor of the server device. The stored code can include code to cause the processor to perform the process 400.

At 402, an initiation signal can be received from a monitor interface device via a cellular network. The initiation signal can be sent from the monitor interface device to the server device following a connection between the monitor interface device and the server device being established via the cellular network. In some embodiments, the initiation signal can include a request for a unique identifier associated with the monitor interface device. Such an identifier can be stored in, for example, a memory of the server device. Alternatively, the identifier can be generated at the server device.

At 404, an identifier can be sent to the monitor interface device via the cellular network such that the monitor interface device can display the identifier on a monitor. In some embodiments, the server device can be configured to retrieve and send the identifier associated with the monitor interface device to the monitor interface device in response to receiving the request for the identifier from the monitor interface device. In some other embodiments, the server device can be configured to generate the identifier associated with the monitor interface device in response to receiving the request for the identifier from the monitor interface device. After receiving the identifier, the monitor interface device can be configured to send the identifier to an output device (e.g., a television) connected to the monitor interface device. The identifier can then be presented by the output device.

At 406, an initialization request including the identifier can be received from a communication device. In some embodiments, the initialization request can be generated by a user using the communication device after the user obtains the displayed identifier from the output device. In such embodiments, the user can enter the identifier into the communication device using a suitable input means. The initialization request including the identifier can then be sent from the communication device to the server device via, for example, a cellular network or a Wi-Fi network.

At 408, the communication device can be associated with the monitor interface device. In response to receiving the initialization request, the server device can be configured to retrieve the identifier from the initialization request, and associate the monitor interface device with the communication device based on the identifier. In some embodiments, such an association can allow the monitor interface device to exchange data, commands, and/or information with the communication device using the server device as a relay hop.

At 410, a list of Wi-Fi network(s) can be sent to the communication device. Such a list of Wi-Fi network(s) can include one or more Wi-Fi networks available to the monitor interface device. The monitor interface device can be configured to generate the list of Wi-Fi network(s) by detecting and/or collecting information associated with Wi-Fi network(s) available to the monitor interface device. The monitor interface device can then be configured to send the list of Wi-Fi network(s) to the server device via the cellular network. After receiving the list of Wi-Fi network(s), the server device can be configured to send the list of Wi-Fi network(s) to the communication device via, for example, a cellular network or a Wi-Fi network.

At 412, Wi-Fi configuration instructions can be received from the communication device. After the list of Wi-Fi network(s) is received at the communication device, a user of the communication device can select a desired Wi-Fi network for the monitor interface device based on the information provided in the list of Wi-Fi network(s). The user can enter Wi-Fi configuration instructions associated with connecting the monitor interface device to the desired Wi-Fi network into the communication device. The communication device can be configured to send the Wi-Fi configuration instructions to the server device via, for example, a cellular network or a Wi-Fi network.

At 414, Wi-Fi configuration instructions can be sent to the monitor interface device. After receiving the Wi-Fi configuration instructions associated with connecting the monitor interface device to the desired Wi-Fi network, the server device can be configured to send the Wi-Fi configuration instructions to the monitor interface device via the cellular network.

At 416, an initialization confirmation can be received from the monitor interface device via a Wi-Fi network. In response to receiving the Wi-Fi configuration instructions from the server device, the monitor interface device can be configured to execute and/or implement the Wi-Fi configuration instructions. For example, a Wi-Fi communication module (e.g., the Wi-Fi communication module 220 in FIG. 2) of the monitor interface device can be configured to implement the Wi-Fi configuration instructions. As a result, the monitor interface device can establish a connection with the desired Wi-Fi network. In some embodiments, an initialization confirmation indicating a successful connection can be sent from the monitor interface device to the server device via the Wi-Fi network or the cellular network. The server device can be configured to further forward the initialization confirmation to the communication device. Following the connection of the monitor interface device to the Wi-Fi network, commands associated with displaying content on the output device can be sent from the server device to the monitor interface device via the Wi-Fi network.

Figure 5:
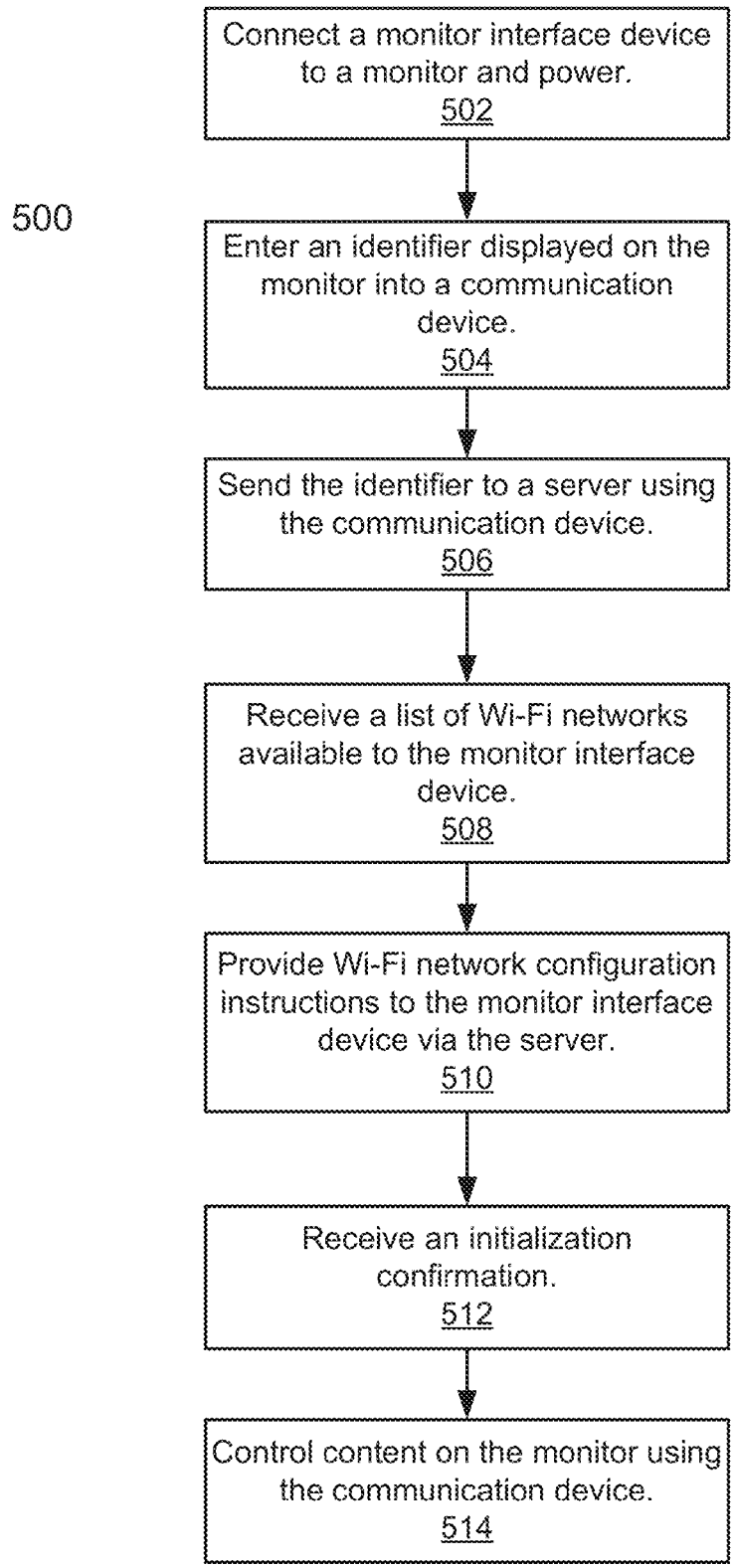
FIG. 5 is a flow chart illustrating a configuration process performed by a user to initialize a network connection for a display device, according to an embodiment.

FIG. 5 is a flow chart illustrating a configuration process 500 performed by a user, according to an embodiment. The user can be an operator of a communication device (e.g., a cellular phone), a monitor interface device, a display device (e.g., a television) and/or other related devices.

At 502, the user can connect the monitor interface device to a monitor and power. The monitor can be a television or any other suitable output device. In some embodiments, the user can use a wire or a cable to connect a connector of the monitor interface device to a connector of the monitor. The connector can be, for example, an HDMI connector, a VGA connector, a USB connector, or a connector compliant with any other suitable video and/or audio standard. In some embodiments, the power can be, for example, a wall outlet, an extension board, or the like. In some embodiments, the monitor interface device can receive power supply from the monitor. In some other embodiments, the monitor interface device can receive power supply from one or more battery cells.

At 504, the user can enter an identifier displayed on the monitor into the communication device. The identifier can be sent from the monitor interface device to the monitor and displayed on the monitor. In some embodiments, the identifier can be used to uniquely identify the monitor interface device. The identifier can be in any suitable format, such as an optical pattern (e.g., a barcode, a QR code) or an alphanumeric format (e.g., a MAC address, a serial number). The user can enter the identifier into the communication device using, for example, a keypad, a mouse, a touch screen, a camera, a microphone, a scanner application, and/or so forth.

At 506, the user can send the identifier to a server using the communication device. After entering the identifier into the communication device, the user can instruct the communication device to send the identifier to the server. In some embodiments, the identifier can be included in an initialization request, as described with respect to FIG. 4. In some embodiments, the identifier can be sent from the communication device to the server via, for example, a cellular network or a Wi-Fi network.

At 508, the user can receive a list of Wi-Fi network(s) available to the monitor interface device. After the identifier is received at the server, the server can be configured to associate the monitor interface device with the communication device based on the identifier. The monitor interface device can be configured to send a list of Wi-Fi network(s) available to the monitor interface device to the server, which can then forward the list to the communication device. Thus, the user can view the list of Wi-Fi network(s) available to the monitor interface device using the communication device.

At 510, the user can provide Wi-Fi network configuration instructions to the monitor interface device via the server. Based on information provided in the list of available Wi-Fi network(s), the user can select a desired Wi-Fi network for the monitor interface device. The user can then enter Wi-Fi network configuration instructions associated with connecting the monitor interface device to desired Wi-Fi network into the communication device. The user can further instruct the communication device to send the Wi-Fi network configuration instructions to the server via, for example, the cellular network. The server can be configured to forward the received Wi-Fi network configuration instructions to the monitor interface device via the cellular network. Thus, the Wi-Fi network configuration instructions can be executed and/or implemented at the monitor interface device. As a result, the monitor interface device can be connected to the desired Wi-Fi network.

At 512, the user can receive an initialization confirmation. After the monitor interface device is connected to the desired Wi-Fi network based on the Wi-Fi network configuration instructions, the monitor interface device can be configured to generate and send an initialization confirmation to the server, which can forward the initialization confirmation to the communication device. Thus, the user can receive the initialization confirmation using the communication device.

At 514, the user can control content on the monitor using the communication device. The initialization confirmation can provide an indication to the user that the monitor interface device has been connected to the server via the desired Wi-Fi network. The user can then enter commands associated with displaying and/or controlling content on the monitor into the communication device. The user can instruct the communication device to send those commands to the server via, for example, a cellular network or a Wi-Fi network. The server can be configured to send the commands to the monitor interface device via the Wi-Fi network. Thus, the commands can be received and executed at the monitor interface device. As a result, content displayed on the monitor can be controlled by the user.

While shown and described above with respect to FIG. 1 as the monitor interface device 120 being connected to and controlling operations of a display device, in other embodiments, a monitor interface device can be connected to and control operations of any type of output device such as, for example, a speaker, a printer, a digital picture frame, and/or the like. For example, the monitor interface device can be connected to and control playing audio content on an audio device. For another example, the monitor interface device can be connected to and control displaying visual content on a digital picture frame.

Additionally, while shown and described above as being distinct from the display device, in other embodiments, the monitor interface device can be built into and/or a part of an output device. In such embodiments, for example, the monitor interface device can be a component or a module within the output device.

While shown and described above with respect to FIG. 1 as the server 150 providing an identifier to the monitor interface device 120 as well as sending commands, instructions and/or display content to the monitor interface device 120, in other embodiments, multiple servers can be operatively coupled to a monitor interface device using different connection means, and interact with the monitor interface device to perform different functions. For example, a first server can be responsible for managing identifiers for monitor interface devices. The first server can be configured to provide an identifier to the monitor interface device 120 via a cellular network. A second server can be responsible for configuring Wi-Fi setup of monitor interface devices. The second server can be configured to send Wi-Fi configuration instructions to the monitor interface device 120 via, for example, the cellular network. A third server can be responsible for providing content to monitor interface devices. The third server can be configured to send display content to the monitor interface device 120 via a Wi-Fi network (after the monitor interface device 120 is connected to that Wi-Fi network). Furthermore, in the example of FIG. 1, the cellular network 170 can be a different cellular network from the cellular network 180. For example, the cellular network 170 can be associated with a carrier (e.g., AT&T, Verizon, T-mobile), and the cellular network 180 can be associated with another carrier.

While shown and described above with respect to FIG. 1 as the monitor interface device 120 being operatively connected to, and receiving instructions and/or content from, the server 150 via the Wi-Fi network 190, in other embodiments, a monitor interface device can have an option to be connected to a network using a wired connection. For example, a monitor interface device can be connected to an Ethernet or a LAN using a network cable. In such embodiments, the monitor interface device can receive instructions and/or content from a server residing in a network (e.g., the Internet) using the wired connection.

While shown and described above with respect to FIG. 1 as the monitor interface device storing cellular connection information associated with connecting the monitor interface device to a default cellular network, in other embodiments, a monitor interface device can store information (e.g., in a memory) associated with another network (e.g., a Wi-Fi network, a satellite network, etc.) associated with connecting the monitor interface device to another type of default network. Thus, after the monitor interface device is turned on or activated, the monitor interface device can be configured to automatically establish a connection with that default network.

While shown and described with respect to FIGS. 3-5 as the monitor interface device detecting available networks and sending a list of available networks to the communication device for selection by a user of the communication device, in other embodiments, the communication device can be configured to detect and collect information associated with available Wi-Fi network(s) (e.g. using the control application) instead of or in addition to the monitor interface device. In such embodiments, for example, the communication device can scan for nearby Wi-Fi network(s) and can present a list of the available Wi-Fi network(s) to the user. If, for example, the user is in an area nearby the monitor interface device, the user can assume that the available Wi-Fi network(s) are also available to the monitor interface device.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a processor configured to send an identifier to an output device such that the output device presents at least one of an optical pattern configured to be received by the communication device via an optical input or an alpha-numeric sequence configured to be received by the communication device via an alpha-numeric input, the at least one of the optical pattern or the alpha-numeric sequence associated with the identifier;
a cellular communication module operatively coupled to the processor, the cellular communication module configured to establish a connection with a cellular network, the cellular communication module configured to send a list of Wi-Fi networks available to a Wi-Fi communication module to a server via the cellular network such that the server can provide the list to a communication device, the cellular communication module configured to receive, from the server via the cellular network, Wi-Fi configuration instructions in response to (1) the server receiving the identifier, (2) the server receiving the list of Wi-Fi networks, and (3) the server receiving, from the communication device, the Wi-Fi configuration instructions; and
a Wi-Fi communication module operatively coupled to the processor, the Wi-Fi communication module configured to establish a connection with a Wi-Fi network based on the Wi-Fi configuration instructions, the Wi-Fi communication module configured to receive, from the communication device, a command configured to control content presented by the output device after the connection with the Wi-Fi network has been established.

2. The apparatus of claim 1, wherein the cellular communication module is configured to send, via the cellular network, a request for the identifier prior to the processor sending the identifier to the output device.

3. The apparatus of claim 1, wherein the at least one of the optical pattern or the alpha-numeric sequence is the optical pattern.

4. The apparatus of claim 1, wherein the at least one of the optical pattern or the alpha-numeric sequence is the alpha-numeric sequence.

5. The apparatus of claim 1, wherein the processor is configured to send the at least one of the optical pattern or the alpha-numeric sequence to the output device when the connection with the Wi-Fi network is inoperable.

6. The apparatus of claim 1, wherein the content presented by the output device includes content configured to be rendered by a web-browser application after the connection with the Wi-Fi network has been established.

7. The apparatus of claim 1, further comprising:
a High-Definition Multimedia Interface (HDMI) connector configured to be operatively coupled to an HDMI connector on the output device.

8. A method, comprising:
sending, from a processor of a monitor interface device, an identifier to an output device such that the output device presents at least one of an optical pattern configured to be received by a communication device via an optical input or an alpha-numeric sequence configured to be received by the communication device via an alpha-numeric input, the at least one of the optical pattern or the alpha numeric sequence associated with the identifier;
sending, to a server via a cellular network a list of Wi-Fi networks available to a Wi-Fi communication module such that the server can provide the list to the communication device;
receiving, from a server via the cellular network, Wi-Fi configuration instructions in response to (1) the server receiving the identifier, (2) the server receiving the list, and (3) the server receiving, from the communication device, the Wi-Fi configuration instructions;
establishing a connection with a Wi-Fi network based on the Wi-Fi configuration instructions;
receiving, from the communication device, a command associated with content presented on the output device; and
sending, from the processor, the command to the output device such that the output device presents content based on the command.

9. The method of claim 8, wherein the monitor interface device is coupled to the output device via a High-Definition Multimedia Interface (HDMI) connector.

10. The method of claim 8, wherein the sending the identifier is at a first time, the method further comprising:
receiving an indication that the connection with the Wi-Fi network is inoperable; and
sending, at a second time after the first time and based on the indication, the at least one of the optical pattern or alpha-numeric sequence to the output device such that the output device presents the at least one of the optical pattern or alpha-numeric sequence.

11. The method of claim 8, further comprising:
sending the identifier to the server such that the server can associate the monitor interface device with the communication device based on the at least one of the optical pattern or alpha-numeric sequence.

12. A non-transitory processor-readable medium storing code representing instructions to be executed by a processor, the code comprising code to cause the processor to:
receive, from a communication device, an identifier associated with a monitor interface device in response to an output device coupled to the monitor interface device presenting at least one of an optical pattern configured to be received by the communication device via an optical input or an alpha-numeric sequence configured to be received by the communication device via an alpha-numeric input, the at least one of the optical pattern or the alpha numeric sequence associated with the identifier;
receive, from the monitor interface device and via the cellular network, a list of Wi-Fi networks available to a Wi-Fi communication module of the monitor interface device;
send the list to the communication device;
associate the communication device with the monitor interface device based on the identifier;
receive, from the communication device and after sending the list, Wi-Fi configuration instructions associated with the monitor interface device;
send the Wi-Fi configuration instructions to the monitor interface device via a cellular network; and
receive, from the monitor interface device, a Wi-Fi connection acknowledgement signal via a Wi-Fi network associated with the monitor interface device.

13. The non-transitory processor-readable medium of claim 12, further comprising code to cause the processor to:
receive, from the monitor interface device and via the cellular network, the identifier prior to associating the communication device with the monitor interface device.

14. The non-transitory processor-readable medium of claim 12, further comprising code to cause the processor to:
receive, from the monitor interface device and via the cellular network, a request for an identifier; and
send, to the monitor interface device via the cellular network, the identifier.

15. The non-transitory processor-readable medium of claim 12, further comprising code to cause the processor to:
provide content to a web-browser application associated with the monitor interface device via the Wi-Fi network after receiving the Wi-Fi connection acknowledgement signal.

16. The non-transitory processor readable medium of claim 12, further comprising code to cause the processor to:
receive, from the communication device, an instruction to control content presented on the output device; and
send, to the monitor interface device via the Wi-Fi network, the instruction such that the monitor interface device can control the content presented on the output device based on the instruction.

* * * * *